(12) United States Patent  
Thyssen et al.

(10) Patent No.: US 9,025,040 B2  
(45) Date of Patent: May 5, 2015

(54) ELECTRONIC USER INTERFACE AND METHOD FOR CONTROLLING PRECISION GUIDED FIRING OF A RIFLE

(75) Inventors: Dane Andrew Thyssen, Dripping Springs, TX (US); John Hancock Lupher, Austin, TX (US)

(73) Assignee: TrackingPoint, Inc., Pflugerville, TX (US)

( * ) Notice: Subject to any disclaimer, the term of this patent is extended or adjusted under 35 U.S.C. 154(b) by 278 days.

(21) Appl. No.: 13/539,374

(22) Filed: Jun. 30, 2012

(65) Prior Publication Data

US 2014/0002680 A1    Jan. 2, 2014

(51) Int. Cl.

| | | |
|---|---|---|
| *H04N 5/228* | (2006.01) | |
| *H04N 5/225* | (2006.01) | |
| *H04N 5/222* | (2006.01) | |
| *F41G 1/00* | (2006.01) | |
| *F41G 1/38* | (2006.01) | |
| *F41G 5/00* | (2006.01) | |
| *G02B 23/00* | (2006.01) | |
| *G03B 17/00* | (2006.01) | |
| *G06G 7/80* | (2006.01) | |
| *F41G 3/06* | (2006.01) | |
| *F41G 3/12* | (2006.01) | |
| *F41G 3/16* | (2006.01) | |
| *H04N 5/232* | (2006.01) | |

(52) U.S. Cl.  
CPC .............. *H04N 5/23267* (2013.01); *F41G 3/06* (2013.01); *F41G 3/12* (2013.01); *F41G 3/165* (2013.01); *H04N 5/23258* (2013.01)

(58) Field of Classification Search  
None  
See application file for complete search history.

(56) References Cited

U.S. PATENT DOCUMENTS

| 8,336,777 | B1* | 12/2012 | Pantuso et al. ................ 235/409 |
|---|---|---|---|
| 2009/0079842 | A1* | 3/2009 | Wilson ...................... 348/222.1 |
| 2009/0285488 | A1* | 11/2009 | Li ................................. 382/190 |
| 2012/0042559 | A1* | 2/2012 | Bockmon ...................... 42/111 |
| 2012/0106170 | A1* | 5/2012 | Matthews et al. ......... 362/311.06 |
| 2014/0110482 | A1* | 4/2014 | Bay .............................. 235/404 |

\* cited by examiner

*Primary Examiner* — Timothy J Henn  
*Assistant Examiner* — Quan Pham  
(74) *Attorney, Agent, or Firm* — Cesari & Reed LLP; R. Michael Reed

(57) ABSTRACT

A rifle scope includes an image sensor configured to capture visual data corresponding to a view area, a display, and a controller coupled to the display and the image sensor. The controller is configured to apply a first stabilization parameter to at least a portion of the visual data to produce a stabilized view, to provide the stabilized view and a reticle to the display, and to apply a second stabilization parameter to stabilize the reticle relative to the stabilized view in response to motion.

23 Claims, 4 Drawing Sheets

ELECTRONIC USER INTERFACE AND METHOD FOR CONTROLLING PRECISION GUIDED FIRING OF A RIFLE

FIELD

The present disclosure is generally related to precision guided firearms and more particularly to methods for precision firing of a gun.

BACKGROUND

A precision guided firearm includes a rifle or other firearm and an intelligent digital optical scope that integrates with, and controls the firing of, the precision guided firearm. The precision guided firearm allows a user to designate or tag a target prior to actually firing on the target, calculates range to the target, and calculates the proper ballistic solution for accurately impacting the target. Once a target is tagged, the intelligent digital optical scope portion of the precision guided firearm tracks the target location relative to the barrel position and delays firing until the firearm's barrel is in the proper position to ensure the firearm fires on target based on the calculated ballistic solution.

Designating or tagging a target with a precision guided firearm in the presence of human jitter can be difficult. In particular, telescopic devices magnify the jitter, making it difficult to accurately designate the target.

SUMMARY

In an embodiment, a rifle scope includes an image sensor configured to capture visual data corresponding to a view area, a display, and a controller coupled to the display and the image sensor. The controller is configured to apply a first stabilization parameter to at least a portion of the visual data to produce a stabilized view, to provide the stabilized view and a reticle to the display, and to apply a second stabilization parameter to stabilize the reticle relative to the stabilized view in response to motion.

In another embodiment, a method includes applying a first stabilization parameter to visual data corresponding to a view area of a rifle scope to produce a stabilized portion of the view area. The method further includes applying a second stabilization parameter to independently stabilize movement of a reticle provided to the display and providing the stabilized portion and the reticle to a display of the rifle scope. Additionally, the method includes determining a location associated with a target within the stabilized portion corresponding to an aimpoint of the reticle relative to the stabilized portion.

In still another embodiment, a viewing device includes one or more image sensors to capture visual data of a view area, a display, and a controller coupled to the display and to the one or more image sensors. The controller is configured to provide a visual representation of a portion of a view area and a reticle to the display, to stabilize the visual representation according to a first stabilization parameter, and to stabilize the reticle according to a second stabilization parameter.

BRIEF DESCRIPTION OF THE DRAWINGS

In the following discussion, the same reference numbers are used in the various embodiments to indicate the same or similar elements.

DETAILED DESCRIPTION OF ILLUSTRATIVE EMBODIMENTS

Figure 1:
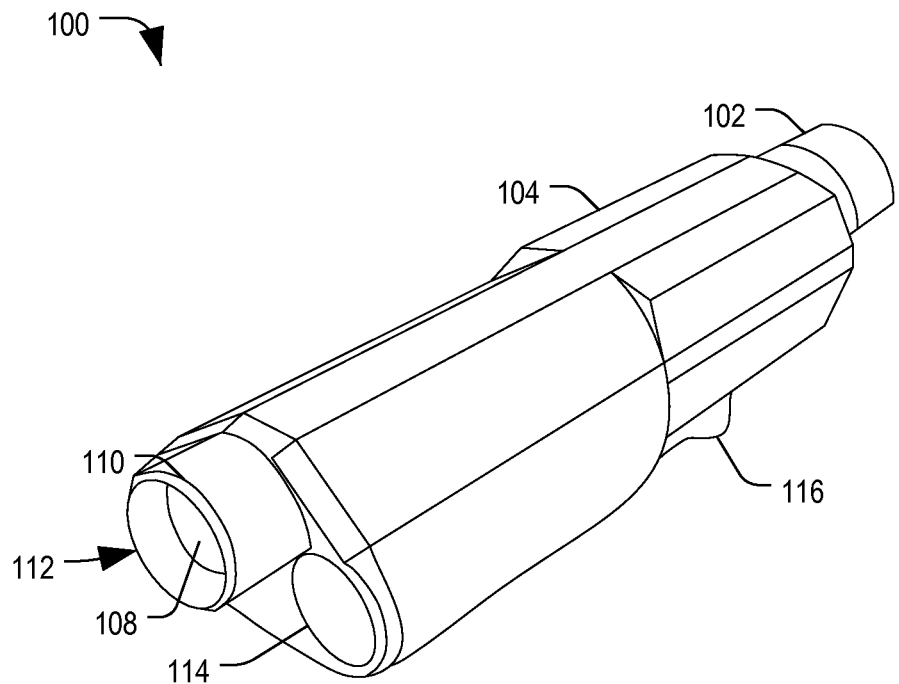
FIG. 1 is a perspective view of an embodiment of a viewing device including circuitry configured to range and tag a target.

Embodiments of a viewing device, such as a rifle scope, are described below that assist the user in selecting a target within a view area, even in the presence of jitter. The viewing device includes a display, a controller, and one or more image sensors to capture visual data associated with a view area that is larger than that presented to the display. The controller is configured to apply a first stabilization parameter to at least a portion of the visual data to produce a stabilized portion and to provide the stabilized portion to the display. The controller is further configured to generate a reticle, to apply a second stabilization parameter to the reticle, and to provide the stabilized reticle to the display. The first and second stabilization parameters dampen the effect of the user's movements with respect to the relative movement of the reticle and the portion of the view area, reducing the effect of jitter to assist the user in aiming at and selecting a target. The controller may then apply a visual marker or tag to the selected target in response to explicit user input (such as a button press), implicit user input (such as detection of directed aiming by a user where the user aims the viewing device at a target for a period of time), or automatic target selection.

In one possible example, the viewing device includes a button accessible by a user to initiate a target selection operation. In response to the user pressing the button, the controller applies the first stabilization parameter to a portion of the visual data and applies a second stabilization parameter to the reticle. Viewing device may include one or more motion sensors configured to detect changes in the orientation of the viewing device and to alter at least one of the portion of the visual data provided to the display according to the first stabilization parameter and the relative position of the reticle according to the second stabilization parameter in response to detecting the changes. The controller may then apply the visual marker or tag in response to the user releasing the button, or in response to detection of a directed aiming event relative to the target within the portion of the viewing area. Alternatively, image sensors may be used to detect the changes in orientation.

In another example, the controller detects directed aiming by the user where the user directs the viewing device toward a particular target for a period of time. In the presence of jitter, the aimpoint of the directed aiming may be at a center of a plurality of aimpoint data. In response to detecting the directed aiming by the user, the controller may select a target and apply a visual marker or tag within the display at a position corresponding to the selected target. In an alternative example, the controller may automatically select a target. In one instance, the controller may use image processing to detect a target within the view area and apply a visual marker or tag to the selected target. One possible embodiment of a viewing device that includes circuitry configured to stabilize a portion of the view area and a reticle using first and second stabilization parameters is described below with respect to FIG. 1.

FIG. 1 is a perspective view of an embodiment of a viewing device 100 including circuitry configured to range and tag a target. Viewing device 100 may be implemented as a spotting scope, a rifle scope, or another viewing device capable of providing a telescopic view of a view area. As used herein, the term "tag" refers to a visual marker or tag that can be applied to a selected target within a portion of the view area shown on a display, and not actually applied to the physical target. Further, as used herein, the term "tagging" refers to the application of the tag or visual marker to the target within the portion of a view area shown on a display.

Viewing device 100 includes an eyepiece 102 through which a user may look to see a portion of a view area on the display. Viewing device 100 includes at least one image sensor configured to capture visual data corresponding to a view area. Viewing device 100 further includes a housing 104 that defines an enclosure sized to secure the circuitry (including a display), environmental parameter sensors, the image sensor(s), and laser range finder circuitry, including a transmitter portion (generally indicated at 112) and a receiver portion 114. Viewing device 100 further includes a lens portion 110 including an objective lens 108 for focusing light toward the image sensors.

Viewing device 100 is configured to stabilize the portion of the view area according to a first stabilization parameter and to stabilize a reticle according to a second stabilization parameter, for example, during a target selection operation. By stabilizing the view area and the reticle, viewing device 100 makes it easier for a user to direct the aimpoint at a target and to select the target. The portion of the view area and the reticle are stabilized independent of one another. In some instances, the first and second stabilization parameters may be substantially equal. The viewing device 100 includes one or more buttons and/or motion sensors configured to receive explicit or implicit user input for selecting a target within the portion of the view area provided to the display. One possible example of an embodiment of the viewing device including one or more buttons and other indicators is depicted in FIG. 2.

Figure 2:
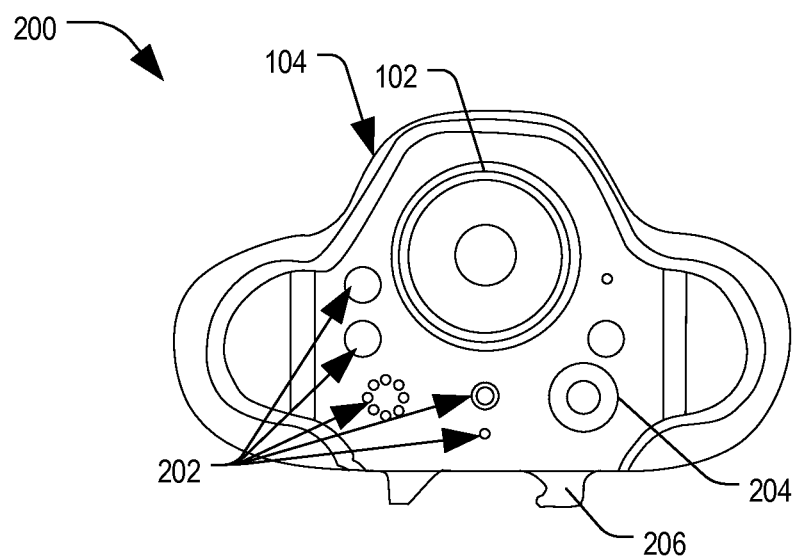
FIG. 2 is a front-view of the viewing device of FIG. 1.

FIG. 2 is a front-view 200 of an embodiment of the viewing device 100 of FIG. 1. In addition to eyepiece 102, viewing device 100 includes a plurality of indicators, generally indicated at 202, which can, for example, depict a current battery charge, a status of a connection to associated circuitry (such as circuitry within a trigger assembly), environmental conditions, and so on. Such indicators may also include user-selectable buttons. Additionally, front-view 200 includes a power button 204 that can be accessed by the user to turn viewing device 100 on or off. Other buttons or indicators may also be included, such as a target tag/range finder button, various mode buttons, or other selectable elements. Further, within the front-view 200, mounting rails, such as rail 206, are visible. Mounting rails 206 are configurable to releasably attach to a structure, such as a corresponding mounting structure of a firearm.

In a particular embodiment, viewing device 100 may be attached to a firearm and configured to operate as a rifle scope. An example of the viewing device 100 configured to operate as a rifle scope to provide a component of a precision guided firearm is described below with respect to FIG. 3.

Figure 3:
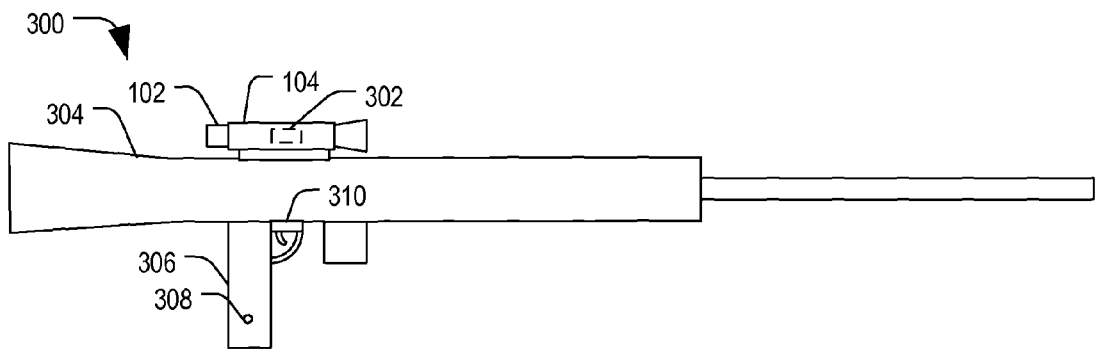
FIG. 3 is a side-view of an embodiment of a firearm system including the viewing device of FIG. 1 implemented as a rifle scope.

FIG. 3 is a side-view of an embodiment of a firearm 300 including viewing device 100 configured to house circuitry 302. Circuitry 302 is configured to stabilize a portion of a view area within a display, to stabilize a reticle, to tag a target within the stabilized portion, and to range the selected target. Viewing device 100 may include one or more buttons with which a user may interact to initiate target selection and/or to select a target. Alternatively, viewing device 100 may receive signals from other sources, such as a button 308 on a grip 306 of a rifle 304 or from a portable computing device, such as a tablet computer or smart phone. Circuitry 302 may be coupled to a trigger assembly 310 to provide a precision-guided firearm.

Circuitry 302 is configured to capture optical data associated with a view area and to provide a visual representation of a portion of the view area and a reticle to the display. In general, circuitry 302 captures optical data corresponding to an area that is larger than the portion provided to the display. Circuitry 302 stabilizes the portion of the view area using a first stabilization parameter, stabilizes a reticle using a second stabilization parameter, and provides the stabilized portion and the reticle to a display. In response to a target selection signal, circuitry 302 may apply a visual marker to a selected target within the view area. The target may be selected by a user by pressing button 308 or some other button on viewing device 100. Alternatively, the target may be selected automatically and/or in response to directed aiming by the user.

In general, the above-described functionality can be implemented by a variety of circuits. One possible example of an embodiment of circuitry 302 is described below with respect to FIG. 4.

Figure 4:
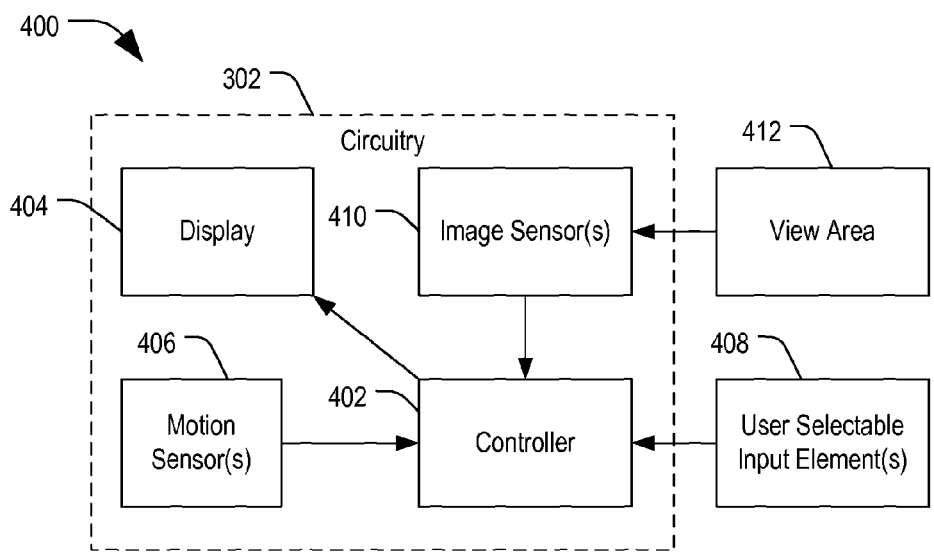
FIG. 4 is a block diagram of an embodiment of a firearm system, such as the firearm system of FIG. 3.

FIG. 4 is a block diagram of an embodiment of a firearm system 400, such as the firearm system 300 of FIG. 3, including a controller 402, a display 404, motion sensors 406, and image sensors 410. Controller 402 may be implemented as a circuit. Alternatively, controller 402 may be implemented as a processor configured to execute instructions stored in a data storage medium.

Image sensors 410 capture optical data associated with a view area 412 and provide the optical data to controller 402. Controller 402 is coupled to display 404 to provide a visual representation of a portion of a view area (corresponding to a subset of the optical data) and to provide a reticle, which can be presented in front of the portion of the view area. Firearm system 400 includes one or more motion sensors 406 (such as gyroscopes, inclinometers, accelerometers, and the like) coupled to controller 402 to provide orientation and motion data that can be used by controller 402 to determine an aimpoint of the firearm system 400.

Firearm system 400 further includes one or more user-selectable input elements 408, such as input/output ports or input terminals configured to receive signals from one or more buttons or switches for receiving user selections and/or user inputs (i.e., signals). In some instances, user-selectable input elements 408 can include a transceiver for sending and receiving data, including user inputs, such as through a wired or wireless communication link. In an example, the transceiver can be used to receive a target-selection input from a portable computing device, such as a laptop, tablet, smart phone, or other portable computing system.

Firearm system 400 includes controller 402 configured to apply a first stabilization parameter to a portion of the optical data corresponding to a field of view of viewing device 100 and a second stabilization parameter to a reticle. Application of the first and second stabilization parameters dampens the relative movement of the reticle and the portion of the optical data of the view area to assist the user in directing the aimpoint toward the target and in selecting the target.

Controller 402 may be implemented as circuitry including a field programmable gate array, as a processor with a memory storing executable instructions, or any combination thereof. One possible example of controller 402 implemented as a processor and a memory is described below with respect to FIG. 5.

Figure 5:
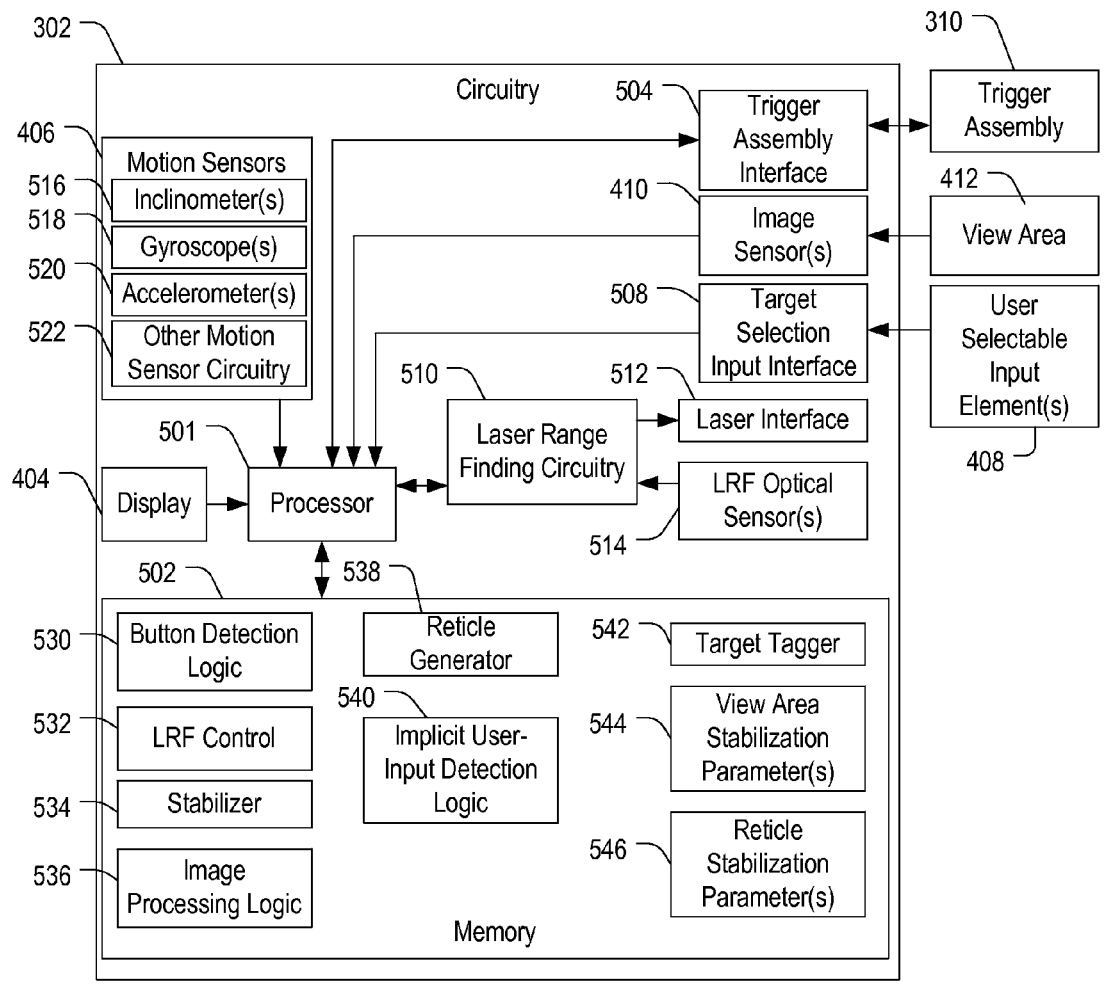
FIG. 5 is a block diagram of an embodiment of a circuit configured to range and tag a target.

FIG. 5 is a block diagram of an embodiment of circuitry 302 of FIG. 3 (or controller 402 of FIG. 4). Circuitry 302 includes a processor 501 coupled to a memory and logic circuit 502. Memory and logic circuit 502 stores instructions that, when executed by processor 501, cause processor to function as controller 402 in FIG. 4. Circuitry 302 further includes display 404 and motion sensors 406 coupled to processor 501. In some instances, motion sensors 406 may include an analog-to-digital converter (ADC) to convert analog sensor signals into digital signals for processor 501. In other instances, circuitry 302 may include an ADC between motion sensors 406 and processor 501.

Circuitry 302 is coupled to trigger assembly 310 and to one or more user-selectable input elements 408. Circuitry 302 includes a trigger assembly interface 504 coupled to trigger assembly 310 to receive and/or detect a trigger pull signal. Circuitry 302 further includes a target selection input interface 508 coupled to user-selectable input elements 408 and configured to receive signals corresponding to user-selections of one or more of the user-selectable input elements 408 (such as buttons or switches) for manual target acquisition and range finding selection. Circuitry 302 further includes image sensors 410 configured to capture optical data associated with a view area 412. Trigger assembly interface 504, target selection input interface 508, and image sensors 410 are coupled to processor 501. Circuitry 302 further includes laser range finder circuitry 510 coupled to processor 501 and to laser interface 512 and laser range finder (LRF) optical sensor(s) 514.

Motion sensors 406 include one or more inclinometers 516 to detect an incline or orientation of the viewing device 100. Motion sensors 406 further include one or more gyroscopes 518 to determine orientation of the viewing device 100 based on principles of angular momentum. Further, motion sensors 406 include one or more accelerometers 520 configured to measure movement of viewing device 100. Motion sensors 406 may also include other motion sensor circuitry 522 that can be used to measure movement and/or to determine the orientation of viewing device 100. Motion sensors 406 provide such movement and/or orientation data to processor 501.

Memory and logic circuit 502 is a processor-readable data storage medium that stores instructions executable by processor 501 to stabilize a portion of the optical data corresponding to view area 412 that is captured by image sensors 410, to stabilize a reticle that is provided to display 404 with the stabilized portion of the optical data, to receive a target selection signal, and to apply a visual marker to a selected target in response to the target selection signal, which may be provided automatically, determined from implicit user feedback, or provided by an explicit user input.

Memory and logic circuit 502 includes button detection logic 530, that when executed, causes processor 501 to detect a button press and/or a button release. In an example, the button press corresponds to pressing of a target selection button 308 on the grip 306 of the rifle 304. In another example, the button press corresponds to pressing of a target selection button on viewing device 100, such as one of the buttons or indicators 202. Additionally, memory and logic circuit 502 includes implicit user-input detection logic 540 that, when executed, causes processor 501 to detect implicit user input (such as directed aiming) and to select a target in response to the implicit user input.

Memory and logic circuit 502 further includes laser range finder (LRF) control instructions 532 that are executable by processor 501 to control laser range finding circuitry 510 to fire a laser beam toward a target (using laser interface 512) and to receive a reflected version of the laser beam from the target (via LRF optical sensors 514) to determine a range to the target. Processor 501 may execute LRF control instructions 532 in response to a button push and/or in response to automatic or user-selection of a target. Memory and logic circuit 502 also includes stabilizer 534 that, when executed, causes processor 501 to stabilize a portion of the optical data of view area 412 received from image sensors 410. Memory and logic circuit 502 further includes reticle generator instructions 538 that, when executed, cause processor 501 to generate a reticle, which is provided to display 404 together with the stabilized portion of the view area. Stabilizer 534 may be used to stabilize the reticle using the same or a different stabilization parameter as compared to that used to stabilize the portion of view area 412.

Memory and logic circuit 502 further includes image processing logic 536 that, when executed, causes processor 501 to automatically process images (optical data) from the image sensors 410 to detect boundaries, to identify targets, etc. In one instance, processor 501 executes image processing logic 536 to automatically identify a target within a portion of the view area, such as by detecting localized motion and identifying boundaries of the target automatically. In some instances, processor 501 may execute image processing logic 536 to detect a change in the orientation of viewing device 100 relative to the view area based on changes in the optical data from image sensors 410 over time.

Memory and logic circuit 502 further includes a target tagger 542 that, when executed, causes processor 501 to apply a visual tag to a target at the center of the reticle, in response to a button press, a button release, implicit user feedback, or some combination thereof. In some implementations, target tagger 542 may automatically select a target using image processing logic 536 to detect the target and may automatically apply a visual tag to the selected target. Memory and logic circuit 502 also stores one or more view area stabilization parameters 544 and one or more reticle stabilization parameters 546, which can be applied by stabilizer 534 to stabilize the portion of the view area and the reticle, respectively. In some instances, stabilizer 534 may select a suitable stabilization parameter, for example, based on the zoom. In this example, zoom refers to the electronic emulation of adjustable focal length. At greater levels of zoom, it may be desirable to dampen the effect of the user's movements by a greater amount, increasing the stabilization to reduce the effect of jitter for both the portion of the view area and the reticle, independently.

In an example that could involve either explicit user input, implicit user input, or automatic target selection and ranging, circuitry 302 receives a signal at target selection input interface 314 that corresponds to receiving a target selection signal. The target selection signal may be received from an input interface or may be provided by processor 501 (either based on detection of "directed aiming" by the user or based on automatic target selection). In response to receiving the signal, circuitry 302 may automatically range the target or the view area 412 using LRF control instructions 532. Alternatively or in addition to ranging the target, in response to receiving the signal, circuitry 302 stabilizes a portion of the view area and a reticle provided to display 404. Circuitry 302 then either uses motion data from motion sensors 406 or processes images from the view area to determine an orientation of viewing device 100 relative to the view area to determine an aimpoint relative to the stabilized portion. The stabilizer 534 dampens the effect of the user's movement, steadying the view area and the reticle in the presence of jitter to assist the user to position the reticle on a target within the stabilized portion of view area 412. In response to a second signal, circuitry 302 attaches a visual marker or tag to the selected target within the stabilized portion.

In one embodiment, circuitry 302 detects a first signal when the button is pressed and uses stabilizer 534 to stabilize the portion of the view area 412 and the reticle in response to the first signal. Circuitry 302 detects a second signal when the button is released and applies the visual marker to the target in response to the second signal. In some examples, the first and second signals may be of the same type and/or magnitude or may be of opposite polarity. In another embodiment, laser range finding and target selection may be initiated through interaction with a touch-sensitive interface provided either on a surface of rifle scope 302, on the grip of the rifle 304, or on a portable computing device, such as a smart phone or tablet computer configured to communicate with viewing device 100. One possible example of a method of operating the viewing device 100 to visually tag (apply a visual marker to) a selected target is described below with respect to FIG. 6.

Figure 6:
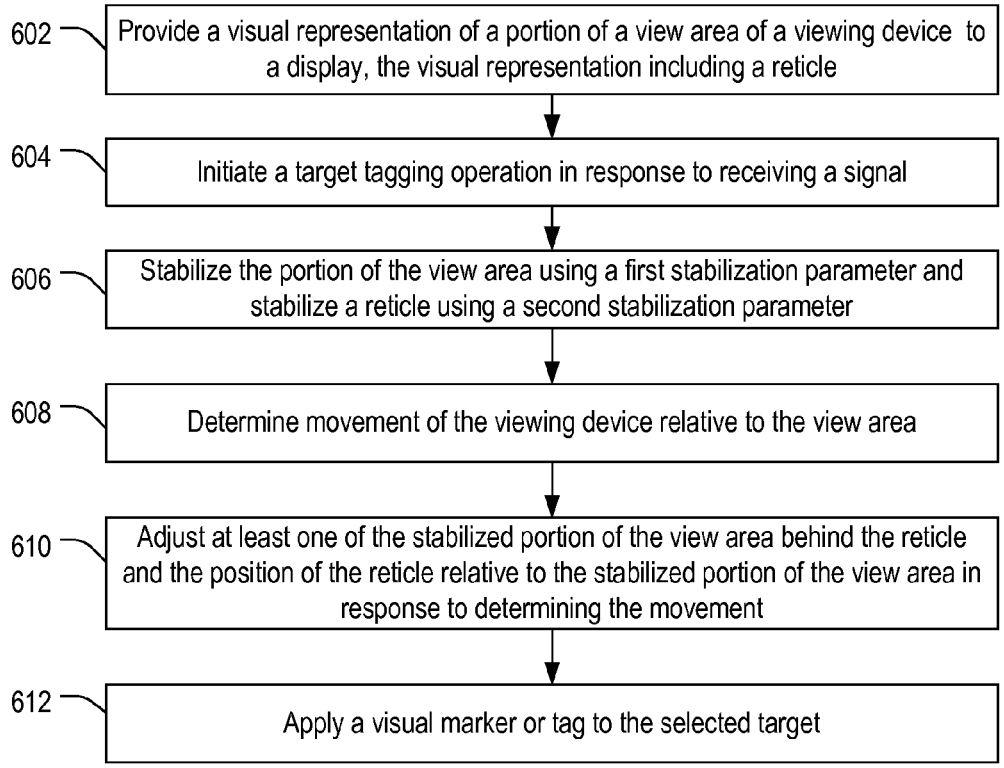
FIG. 6 is a flow diagram of an embodiment of a method of tagging a target using the telescopic device of FIGS. 1-4 and/or the circuit of FIG. 5.

FIG. 6 is a flow diagram of an embodiment of a method 600 of tagging a target using the telescopic device of FIGS. 1-4 and/or the circuit of FIG. 5. At 602, a visual representation of a portion of a view area of a telescopic device is provided to a display, where the visual representation includes a reticle. Advancing to 604, a target tagging operation is initiated in response to receiving a signal. The signal may correspond to explicit user input (such as a button press), implicit user input (such as detection of directed aiming by the user), or automatic target selection. Continuing to 606, controller 402 stabilizes a portion of the view area using a first stabilization parameter and stabilizes a reticle using a second stabilization parameter. The first and second stabilization parameters may be the same. In some instances, controller 402 may select a first suitable stabilization parameter for the view area 412 based and may select a second suitable stabilization parameter for the reticle.

Moving to 608, controller 402 determines movement of viewing device 100 relative to view area 412. In an example, controller 402 uses motion data from motion sensors 406 to determine movement of viewing device 100 in order to determine the aimpoint. In another example, controller 402 uses image processing logic 536 to determine movement of viewing device 100 relative to view area 412 to determine the aimpoint.

Proceeding to 610, controller 412 adjusts at least one of the stabilized portion of the view area behind the reticle and the position of the reticle relative to the stabilized portion of the view area in response to determining the movement. In an example, the user's movements may be dampened or filtered (digitally) to reduce jitter and to assist the user to align the center of the reticle to the desired target.

Continuing to 612, controller 402 applies a visual marker or tag to the selected target. In one instance, controller 402 receives a button release signal and applies the visual marker to the selected target in response to the button release signal. In another instance, controller 402 detects directed aiming by the user and applies the visual marker in response to detecting the directed aiming. In another instance, controller 402 receives an automatic target selection signal and applies the visual marker in response thereto.

Although the present invention has been described with reference to preferred embodiments, workers skilled in the art will recognize that changes may be made in form and detail without departing from the scope of the invention.

What is claimed is:

1. A rifle scope comprising:
   an image sensor configured to capture visual data corresponding to a view area;
   a display; and
   a controller coupled to the display and the image sensor, the controller, in a target selection mode, configured to apply a first stabilization parameter to at least a portion of the visual data to produce a stabilized view, to provide the stabilized view and a reticle to the display, and to apply a second stabilization parameter to stabilize the reticle to dampen movement of an aimpoint corresponding to the reticle relative to the stabilized view in response to motion.

2. The rifle scope of claim 1, further comprising:
   an input interface configured to receive a signal corresponding to a user interaction with a button; and
   wherein the controller is configured to determine a location of a target within the stabilized view in response to receiving the signal.

3. The rifle scope of claim 2, wherein the controller is configured to apply a visual marker to the target within the stabilized view.

4. The rifle scope of claim 1, wherein the controller is configured to determine motion data, to detect a directed aiming event based on the motion data, and to automatically select a target in response to detecting the directed aiming event.

5. The rifle scope of claim 4, wherein the controller automatically applies a visual marker to the target.

6. The rifle scope of claim 1, further comprising:
   at least one motion sensor coupled to the controller and configured to detect changes in an orientation of the image sensor; and
   wherein the controller is configured to stabilize movement of the reticle relative to the stabilized view in response to detecting the changes.

7. The rifle scope of claim 1, wherein:
   the controller is configured to detect changes in an orientation of the image sensor by processing the visual data of the view area to determine an orientation of the image sensor; and
   the controller is configured to stabilize movement of the reticle relative to the stabilized view in response to detecting the changes.

8. The rifle scope of claim 1, wherein the first stabilization parameter and the second stabilization parameter are substantially equal.

9. A method comprising:
   applying, in a target selection mode, a first stabilization parameter to visual data corresponding to a view area of a rifle scope to produce a stabilized portion of the view area;
   applying, in the target selection mode, a second stabilization parameter to independently stabilize movement of a reticle to dampen movement of an aimpoint corresponding to the reticle relative to the stabilized portion;
   providing the stabilized portion and the reticle to a display of the rifle scope; and
   determining a location associated with a target within the stabilized portion corresponding to the aimpoint of the reticle relative to the stabilized portion.

10. The method of claim 9, wherein determining the location associated with the target comprises:
    detecting a directed aiming event based on motion data from one or more motion sensors; and automatically selecting a target in response to detecting the directed aiming event.

11. The method of claim 9, wherein determining the location associated with the target comprises:
   detecting a directed aiming event based on image processing; and
   automatically selecting a target in response to detecting the directed aiming event.

12. The method of claim 9, further comprising applying a visual marker to the target within the stabilized portion in response to determining the location associated with the target.

13. The method of claim 9, wherein determining the location associated with the target comprises:
   receiving a target selection signal at an interface; and
   determining the location based on a position of the reticle relative to the stabilized portion when the target selection signal is received.

14. The method of claim 13, wherein the target selection signal comprises at least one of a button press and a button release.

15. The method of claim 13, wherein determining the location comprises image processing the stabilized portion to automatically identify the location of the target.

16. The method of claim 9, wherein the first stabilization parameter and the second stabilization parameter are substantially equal.

17. A viewing device comprising:
   one or more image sensors to capture visual data of a view area;
   a display; and
   a controller coupled to the display and to the one or more image sensors, the controller configured to provide a visual representation of a portion of the visual data and a reticle to the display, the controller configured to stabilize the visual representation according to a first stabilization parameter and to stabilize the reticle according to a second stabilization parameter to dampen movement of an aimpoint corresponding to the reticle relative to the stabilized visual representation.

18. The viewing device of claim 17, further comprising:
   one or more motion sensors configured to detect motion data of the viewing device; and wherein the controller is configured to adjust at least one of the portion provided to the display and a position of the reticle relative to the portion according to the second stabilization parameter in response to detecting the motion data.

19. The viewing device of claim 18, wherein the controller is configured to detect a directed aiming event based on the motion data, to automatically select a target in response to detecting the directed aiming event, and to automatically apply a visual marker to the target.

20. The viewing device of claim 17, wherein the controller is configured to:
   process the visual data to determine an orientation of the viewing device relative to the visual representation; and
   adjust at least one of the portion provided to the display and a position of the reticle relative to the portion according to the second stabilization parameter in response to determining the orientation.

21. The viewing device of claim 17, wherein the controller receives a signal corresponding to selection of a target location within the portion of the view area and applies a visual marker to a target at the target location in response to receiving the signal.

22. The viewing device of claim 21, further comprising:
   an interface configured to receive the signal; and
   wherein the signal corresponds to at least one of a button press and a button release.

23. The viewing device of claim 17, wherein the first stabilization parameter and the second stabilization parameter are substantially equal.

* * * * *